United States Patent
Saeki

[11] Patent Number: 5,213,415
[45] Date of Patent: May 25, 1993

[54] AGITATOR USING A PLANETARY CONE TYPE TRANSMISSION UNIT

[75] Inventor: Setsuo Saeki, Settsu, Japan
[73] Assignee: Daikin Industries Ltd., Osaka, Japan
[21] Appl. No.: 653,876
[22] Filed: Feb. 11, 1991

Related U.S. Application Data

[63] Continuation of Ser. No. 425,875, Oct. 24, 1989, abandoned.

[30] Foreign Application Priority Data

Nov. 4, 1988 [JP] Japan .................. 63-144667

[51] Int. Cl.⁵ .................. B01F 7/16; F16H 15/16
[52] U.S. Cl. .................. 366/294; 366/295; 366/296; 475/194
[58] Field of Search .................. 366/66, 245, 246, 287, 366/288, 293, 294, 295, 296, 297, 298, 299, 300; 475/193–195

[56] References Cited

U.S. PATENT DOCUMENTS

| | | | |
|---|---|---|---|
| 2,209,287 | 7/1940 | Simpson | 366/296 |
| 3,023,642 | 3/1962 | Maichen | 475/194 X |
| 4,403,868 | 9/1983 | Kupka | 366/295 |
| 4,643,046 | 2/1987 | Kaneyuki | 475/194 X |
| 4,751,854 | 6/1988 | Sakai et al. | 475/194 X |
| 4,918,665 | 4/1990 | Herfeld | 366/295 |

FOREIGN PATENT DOCUMENTS

| | | | |
|---|---|---|---|
| 607830 | 7/1926 | France | 366/295 |
| 1315140 | 12/1962 | France | 366/295 |

Primary Examiner—Harvey C. Hornsby
Assistant Examiner—Charles Cooley
Attorney, Agent, or Firm—Stevens, Davis, Miller & Mosher

[57] ABSTRACT

A power transmission apparatus which interposes a transmission unit having a rotatable retainer, a plurality of planetary cones rotatably supported on the retainer and revolvable by rotation of the retainer, and a speed control member for controlling revolutions of the planetary cones, between an input unit having an input rotary member and an output unit having an output rotary member, the input unit being provided with an extension shaft integrally rotatable with the input shaft, the extension shaft extending axially outwardly of the output shaft through the output unit and transmission unit, thereby enabling power in two systems to be taken out.

1 Claim, 2 Drawing Sheets

AGITATOR USING A PLANETARY CONE TYPE TRANSMISSION UNIT

This application is a continuation of application Ser. No. 425,875, filed Oct. 24, 1989, now abandoned.

FIELD OF THE INVENTION

The present invention relates to a power transmission apparatus for transmitting power from an input shaft speed-changeably to an output shaft, and more particularly to a power transmission apparatus suitable for, for example, a slurry agitator.

BACKGROUND OF THE INVENTION

Conventionally, power transmission apparatus of various mechanisms for transmitting power of the input shaft to an output shaft have been provided, in which an apparatus using planetary cones as shown in FIG. 2 is provided.

The prior art power transmission apparatus shown in FIG. 2 will simply be described. An input disc 102 is integral with an axial end of an input shaft 101, a cam disc 105 is provided at an output shaft 103 through a pressure governor cam 104, between the input disc 102 and the cam disc 105 are interposed a plurality of planetary cones 107 rotatably supported on a retainer 106, and a ring-like speed control member 108 is brought into frictional contact with a conical portion of each planetary cone 107, so that the speed control member 108 is adjusted in position in the direction of the arrow E or F, thereby transmitting power from the input shaft 101 to the output shaft 103 at a predetermined reduction ratio.

In detail, when the input shaft 101 is rotatably driven to drive the input disc 102, the planetary cones 107 in contact with the outer periphery of the input disc 102, and the retainer 106 rotates depending on the contact position of the speed control member 108 with the cones 107, so that the planetary cones 107 revolve. Thus, the rotation and revolution of each planetary cone 107 allow the cam disc 105 to rotate at a predetermined reduction ratio with respect to the input shaft 101.

In addition, in FIG. 2, the speed control member 108 is displaced in the direction of the arrow E so as to reduce the speed, and in the direction of the arrow F so as to increase the speed, the speed control member 108 being positioned at the crest of each conical portion 107a, whereby the cam disc 105 rotates in an equal number of rotations to the input shaft 101.

The conventional power transmission apparatus constructed as above-mentioned transmits power from the input shaft 101 only to the output shaft 103. Therefore, the power can be taken out in only one system from the output shaft 103, but not in two systems.

Accordingly, in a case where the above-mentioned power transmission apparatus is used in, for example, a slurry agitator, i.e. when agitating vanes disposed in an agitating tank are coupled with the output shaft 103 so as to agitate slurry in the agitating tank by the vanes, the vanes are only driven by power in one system taken out from the input shaft 101 to the output shaft 103, whereby the slurry to be agitated, even when moved at the central portion of the tank, is less moved between the central portion and the peripheral portion of the same. As the result, the entire shearing effect on the slurry by the vanes is not obtainable, thereby causing the defect of deteriorating the agitation efficiency.

In order to improve the entire shearing effect with respect to the slurry, it is considered that two drive sources be used to drive agitating vanes at a peripheral portion and a central portion of the tank in a different number of rotations and in different directions. Such means, however, requires an additional drive source, thereby creating the problem in that the agitator becomes not only complicated in construction but also large-sized as a whole.

SUMMARY OF THE INVENTION

An object of the invention is to provide a power transmission apparatus which can transmit power from an input shaft to an output shaft at a predetermined speed change ratio and also take out the power input to one input shaft as that in two-systems different in the number of rotations and in the rotation direction.

The power transmission apparatus of the invention, which transmits power of an input shaft to the output shaft in relation of being changeable of the rotation speed, is characterized by providing; an input unit provided with the input shaft and an input rotary member rotatable in association with the input shaft; an output unit provided with an output shaft disposed coaxially with the input shaft and an output rotary member in association with the output shaft and for rotating the output shaft; and a transmission unit which is interposed between the input rotary member and the output rotary member, transmits to the output unit the power transmitted to the input unit, and comprises a rotatable retainer interposed between the input rotary member and the output rotary member, a plurality of planetary cones rotatably supported on the retainer and revolvable by rotation of the retainer and each provided with a conical portion, a first round slidable contact portion in frictional contact with the input rotary member, and a second round slidable contact portion in frictional contact with the output rotary member, and a ring-like speed control member which comes into contact with the conical portion of each planetary cone so as to control revolution of each planetary cone and which is stationary in the rotation direction and axially adjustable in position; the input unit being provided with an extension shaft integrally rotatable with the input shaft, the output unit and transmission unit being provided with an insertion bore through which the extension shaft freely perforates, the extension shaft extending axially outwardly of the output shaft, the output shaft being provided with a first power takeout unit, and the extension shaft being provided with a second power takeout unit.

Accordingly, in the above-mentioned construction, the first power takeout unit can take out power in one system at a predetermined speed change ratio with respect to the input shaft and different in the rotation direction and the second power takeout unit on the extension shaft extending in the same direction as the output shaft can take out power in another system equal in the number of rotations to the input shaft and rotatable in the same direction as the same.

A first driven member is mounted to the first power takeout unit at the output shaft, and a second driven member is mounted to the second power takeout unit at the extension shaft, so that the input shaft is driven to drive the first and second driven members in the different rotation directions and in the different numbers of rotations.

Also, the first and second driven members can be agitating vanes used for an agitator, thereby making the apparatus suitable for a slurry agitator.

In detail, the agitating vanes, which are provided at the second power takeout unit at the extension shaft, can be driven in an equal number of rotations to the input shaft and in the same rotation direction as the input shaft, resulting in that agitation at the central portion of the agitating tank can be performed and separate agitating vanes are provided at the first power takeout unit at the output shaft so as to be rotatably driven outside the former agitating vanes in the reverse rotation direction to the input shaft, in other words, in the reverse rotation direction to the agitating vanes provided at the second power takeout unit, and in the number of rotations controlled at a predetermined speed change ratio with respect to the input shaft. Hence, a slurry-like substance having been agitated at the central portion of the agitating tank can be agitated by the outside agitating vanes in the reverse rotation direction and a predetermined number of rotations, thereby increasing the shearing effect to improve the agitating efficiency. Accordingly, the slurry-like substance to be agitated in the agitating tank can be agitated in a short time, uniformly, and efficiently.

Other objects and advantages of the invention will become apparent during the following discussion of the accompanying drawings.

DETAILED DESCRIPTION OF THE INVENTION

Figure 1:
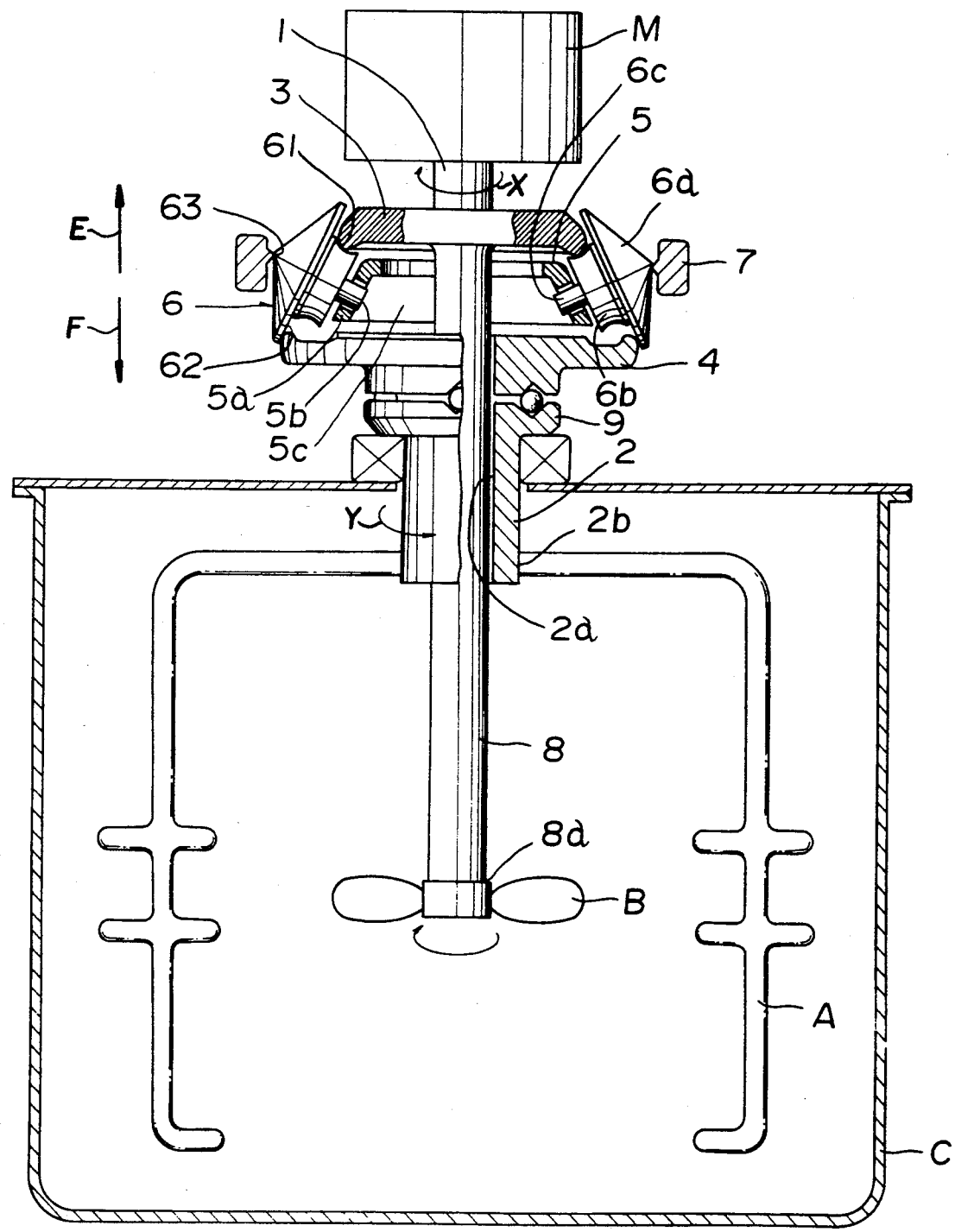
FIG. 1 is a partially cutaway front view of an embodiment of a power transmission apparatus of the invention, which is applied to an agitator.
Figure 2:
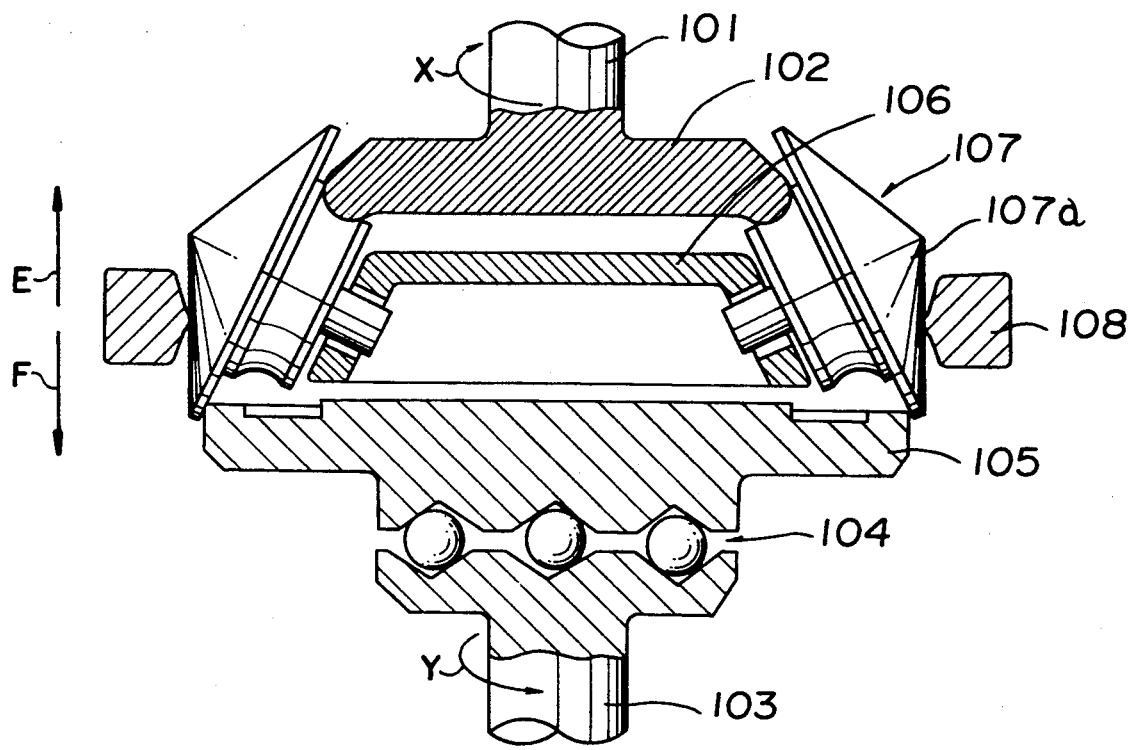
FIG. 2 is a partially sectional elevational view exemplary of the conventional power transmission apparatus.

Referring to FIG. 1, the power transmission apparatus of the invention applied to the agitator basically comprises; an input unit provided with an input shaft 1 driven in association with a drive source M, such as a motor, and an input rotary member rotatable in association with the input shaft 1; an output unit provided with an output shaft 2 disposed coaxially with the input shaft 1 and an output rotary member 4 in association with the output shaft 2 and for rotating the output shaft 2; and a transmission unit provided with a freely rotatable retainer 5 interposed between the input rotary member 3 and the output rotary member 4, but not secured to either so as to transmit to the output unit power transmitted to the input unit, a plurality of planetary cones 6, to be discussed below, rotatably supported on the retainer 5 and revolvable by rotation of the retainer 5 which is rotated by the revolutions of the planetary cones which are in turn driven by the input rotary member 3 and a ring-like speed control member 7 for controlling the revolution of the planetary cones 6; so that the power of the input shaft 1 is adapted to be transmitted from the input shaft 1 to the output shaft 2 through the planetary cones 6 and output rotary member 4.

In addition, in the embodiment shown in FIG. 1, an automatic pressure adjusting cam 9 is interposed between the output rotary member 4 and the output shaft 2, so that the input rotary member 3, output rotary member 4 and non-rotatable speed control member 7, are respectively contacted by the planetary cones 6 through their contact faces with optimum contact force, as discussed below, thereby preventing the occurrence of a slip or wear at the slidable contact faces.

The automatic pressure adjusting cam 9 is provided to obtain the aforesaid merit, and which may not be particularly provided. In a case where the cam 9 is not provided, the output shaft 2 and output rotary member 4 need only be integral with each other, thereby simplifying construction of the apparatus to that extent.

Each planetary cone 6 comprises a conical portion 6a, a neck 6b in continuation of the bottom surface of conical portion 6a and having the outer peripheral surface circumferential concaved, and a stem 6c projecting from the neck 6b, the stems 6c freely extending through a plurality of support bores 5b provided at the peripheral wall 5a of the retainer 5, the respective planetary cones 6 being rotatably supported on the retainer 5.

Also, at the outer periphery of the neck 6b at each planetary cone 6 is provided a first round slidable contact portion 61 in contact with the input rotary member 3, near the outer periphery of the rear surface of each cone 6 is provided a second round slidable contact portion 62 in contact with the output rotary member 4, and at the conical surface of the conical portion 6a is provided a third round slidable contact portion 63 in contact with the speed control member 7 which is not-rotatable but axially slidably adjustable along directions E and F. The planetary cones 6 each are supported by contact of the input rotary member 3 with the first round slidable contact portion 61, that of the output rotary member 4 with the second round slidable contact portion 62, and that of the speed control member 7 with the third round slidable contact portion 63. Such three-point support at the respective contact points keeps the stem 6c of each planetary cone 6 from being loaded and the force being distributed is distributed uniformly among all three of the contact points.

The rotation from the input shaft 1 is transmitted from the input rotary member 3 to the output rotary member 4 through the respective planetary cones 6, at which time a contacting force is uniformly distributed to the transmission contact points, and since the stem 6c of each planetary cone 6 is in an unloaded condition, even when an overload is generated at the output side, the rotation can be transmitted without creating a slip.

The speed control member 7, which is non-rotatable, is adapted to be axially slidably adjustable so as to adjust the contact position of the speed control member 7 with the third slidable contact portion 63, whereby power in a different number of rotations from the input shaft 1 is taken out. For example, as shown in FIG. 1, when the speed control member 7 is brought into contact with the uppermost portion of third slidable contact portion 63 at the crest of each conical portion 6a, the retainer 5 stops its rotation, and the planetary cones 6 do not revolve but only rotate. As the result, the output shaft 2 rotatably driven through the planetary cones 6 rotates in the same number of rotations as the input shaft 1 so that the power of the same number of rotations as the input shaft 1 is taken out from a first power takeout unit 2b provided at the axial end of output shaft 2.

The speed control member 7 is downwardly slid from the crest to contact with the lower portion of the third slidable contact portion 63, whereby an amount of contact movement at the third slidable contact portion 63 increases so that the retainer 5 rotates and the planetary cones 6 rotate while revolving. Hence, the output shaft 2 rotatably driven therethrough is reduced in its rotation speed to the extent of the revolution of planetary cones 6, and taken out from the first power takeout unit 2b at the output shaft 2.

In other words, the speed control member 7 adjusted in position can change the rotation speed in a stepless manner throughout the entire range from non-rotation of output shaft 2 to the same number of rotations as the input shaft 1.

Since the planetary cones 6 are interposed between the input shaft 1 and the output shaft 2, when the rotation direction of the input shaft 1 is represented by the arrow X, power in a different rotation direction of the arrow Y is taken out from the output shaft 2.

In the above-mentioned power transmission apparatus, a vertically extending insertion bore 2a is formed at the axial inside of the output rotary member 4 and output shaft 2, and an extension shaft 8, which is inserted in a freely fitting manner through the insertion bore 2a and a central opening 5c provided at the retainer 5 and extends downwardly from the output shaft 2. The extension shaft 8 integrally projects downwardly from the input rotary member 3 which is fixed to the axial end of input shaft 1.

The extension shaft 8, which is integral with the input shaft 1 through the input rotary member 3, is driven by the input shaft 1 and rotates integrally therewith. Hence, the power in the equal number of rotations to and in the same rotation direction X as the input shaft 1 can be taken out from the second power takeout portion 8a at the extension shaft 8.

The power which can be taken-out therefrom is a separate system, in other words, in the reverse rotation direction and in an equal or a different number of rotations, thereby enabling the power to be different in the number of rotations and in the rotation direction to be taken out with respect to drive of motor M.

Accordingly, the power transmission apparatus of the invention, as shown in FIG. 1, is made suitable for the agitator for agitating the slurry-like substance.

Referring to FIG. 1, the aforesaid power transmission apparatus is disposed at the center of an agitator tank C, the input shaft 2 and extension shaft 8 project into the tank C, outside agitating vanes A rotatable at the peripheral portion of tank C are fixed to the first power takeout portion 2b, and central agitating vanes B rotatable at the center of the tank C are fixed to a second power takeout portion 8a at the extension shaft 8. Thus, the input shaft 1 is driven by the drive source M, such as a motor, so as to rotate the outside agitating vanes A in the direction Y through the output shaft 2. The central agitating vanes B are rotated in the direction X through the extension shaft 8, and the central and outside agitating vanes B and A rotate in different directions from each other, whereby the slurry movement at the center and peripheral portion of the tank C increases and the entire shearing effect of the slurry contained in the tank C is raised, thereby remarkably improving the slurry agitating efficiency.

In addition, the present invention is not limited to the above-mentioned construction of the embodiment, but may be changeable within the scope of the appended claims and of course is applicable for a use other than the agitator for the slurry-like substance.

While a preferred embodiment of the invention has been described using specific terms, such description is for illustrative purpose only, and it is to be understood that changes and variations may be made without departing from the spirit or scope of the following claims.

What is claimed is:
1. An agitator for agitating material in an agitating tank comprising:
(a) an input unit provided with a drive means, an input shaft and an input rotary member rotatably associated with said input shaft;
(b) an output unit having an annular elongated body with an axial end and provided with (i) an output shaft disposed in axial alignment with said input shaft, said output shaft having a center portion provided with an axial insertion bore and provided at an axial end with a first power takeout portion and (ii) an output rotary member having a center portion provided with an insertion bore, said output rotary member secured to and rotatable with said output shaft with, said insertion bores being in alignment;
(c) a transmission unit interposed between said input rotary member and said output rotary member so as to transmit to said output unit power transmitted to said input unit, and comprising,
(c-1) a freely rotatable retainer interposed between said input rotary member and said output rotary member but not secured to either said member and having a center portion provided with an aperture;
(c-2) a plurality of planetary cones which are freely rotatably supported on said retainer and project radially outward therefrom and provided with a radial outward conical portion, a first round slidable contact portion in frictional contact with said input rotary member and a second round slidable contact portion in frictional contact with said output rotary member, whereby the planetary cones rotate due to rotation of said input rotary member; and
(c-3) a ring-like speed control member, having a center axis, positioned around said planetary cones to come into contact with said conical portions of said planetary cones so as to frictionally engage said conical portions to control revolution of said planetary cones around an axis of said aperture of said retainer, said speed control member being non-rotatable relative to said planetary cones and adjustable along a direction parallel to said center axis;
(d) an extension shaft integral with and extending from said input rotary member and integrally and coaxially rotatable with said input shaft, said extension shaft having a second power takeout portion, said extension shaft freely extending through said insertion bores of said output rotary member and said output shaft and through the aperture of said retainer;
(e) outside agitating vanes mounted on said first power takeout portion of said output shaft and located near the periphery of said agitating tank; and
(f) center agitating vanes mounted on said second power takeout portion of said extension shaft and located at the center of said agitating tank, whereby rotation of said input shaft by said drive means enables said center agitating vanes to rotate at high speed and in one direction and said outside agitating vanes to rotate at a lower speed and in the opposite direction.

* * * * *